Patented Dec. 21, 1937

2,102,633

UNITED STATES PATENT OFFICE 2,102,633

PRODUCTION OF METALLIC DRIERS

Kenneth E. Long, South Euclid, Ohio, assignor to The Harshaw Chemical Company, Elyria, Ohio, a corporation of Ohio No Drawing. Application November 10, 1933, Serial No. 697,472

12 Claims. (Cl. 134—57)

This invention relates to driers for use in paints, varnishes, printing inks, etc. and it is among the objects of the invention to provide improved driers of high metallic content and controlled acidity or basicity. A further object is the provision of a convenient and effective manufacturing procedure for making acid, neutral or basic driers containing one or more metals. Other objects and advantages will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In accordance with the present invention, a basic lead salt of an organic acid of the fatty acid type is modified by an agent providing an organic carboxyl acid radical reactive therewith, and thus which may be an organic acid, a neutral or acid lead salt of an organic acid, or a neutral or acid organic salt of a drier metal, such as cobalt, manganese, zinc. For instance, as the basic lead salt there may be employed a metallic salt which is prepared by intimately mixing and reacting between lead oxide, PbO, and a fatty acid such as linseed fatty acid, an acid derived from petroleum, as naphthenic acids, synthetic fatty acids made by the oxidation of petroleum hydrocarbons, etc., the formation of the lead salt being carried out at temperatures below 100° C., and with final driving off of reaction-water by raising the temperature, for instance to 100°–200° C. To such a basic salt there is added, with intimate incorporation, a modifying substance of the types mentioned. Advantage is taken of the basic character of the lead salt to accomplish the formation of desirable properties in each case. For instance, a basic lead salt of high metallic content may be modified by mixture and reaction with rosin acids to form a less basic, neutral or acid drier with varying physical characteristics. For certain purposes, such as printing ink driers, it is of particular advantage to thus be able to vary the viscosity and penetration of the drier. Such modification of a basic drier allows combinations impossible to achieve by mixtures of neutral or acid driers.

If instead of using rosin, a fused acid lead resinate is mixed and reacted with a basic lead drier, it is possible to obtain a neutral, basic or slightly acid drier with high metallic content and a high proportion of the cheap rosin acids. As it is extremely difficult to prepare a neutral lead resinate by the old fusion process, this procedure furnishes a convenient method of preparing and controlling the acidity of compounds which may be used in the place of lead resinate.

Ordinary cobalt, manganese and zinc driers heretofore known often require free organic acid to keep them in solution in paint solvents. But free acid inhibits the drying of the paint film. In the present invention, by mixing and reacting a neutral or acid salt of this kind with a basic lead drier, the resulting combined drier, even though basic, is perfectly stable in paint solvents, and due to the lack of free acid is a more efficient drier.

The practice of the invention may be carried out in several convenient ways. For example, the basic lead drier may be melted together with the modifying substance. If the modifying substance is an acid or contains free acid, water is formed by the reaction with the basic lead and is removed by heating. Thus it is possible to make basic, neutral or slightly acid mixed driers from the cheaper but highly acid fused salts of cobalt, manganese and zinc. Again, a mixed drier may be advantageously prepared by incorporating the cobalt, manganese or zinc either as neutral or acid organic salts or directly as hydrate or carbonate, into the organic acid used to make the basic lead salt. This solution of metallic drier in organic acid is used exactly as if it were all acid and is mixed in the usual manner with litharge to form a basic lead salt.

Examples illustrative of the invention may be noted as follows:

I. About 100 parts of synthetic fatty acids made by the oxidation of petroleum hydrocarbons, and having an acid value of about 360, are thoroughly mixed with about 115 parts of lead oxide, PbO, advantageously by grinding on an ink mill, the temperature being maintained below 100° C. for reaction, and then finally being raised to above 100° C. to drive off water of reaction. The highly basic lead salt so formed is then thoroughly mixed by melting with 30 per cent of its weight of rosin. The lead salt resultant is a combination with synthetic fatty acids and rosin acids, the basicity of the primary lead fatty acid compounds being modified, and the product containing about 40 per cent of lead, and being soluble in paint solvents, such as mineral spirits, xylol, etc., and also in linseed oil.

II. In the above example there is added instead of rosin, a highly acid lead resinate containing approximately 16 per cent lead in the amount of twice the weight of the basic lead salt. An approximately neutral mixed salt is formed, containing a high percentage of rosin and about 28 per cent lead. This mixed salt may be used in place of fused lead resinate as a drier, and is far superior in drying qualities and stability in solvents.

III. About 25 parts of cobalt naphthenate containing 3 parts of cobalt are mixed by melting together with 75 parts of a highly basic lead naphthenate containing 30 parts of lead. The resulting product is a highly basic mixed drier containing 3 per cent cobalt and 30 per cent lead which is perfectly stable in paint solvents and is a highly efficient drier.

I do not of course limit myself to these proportions or procedures, but give these examples as illustrations of the modification of a basic lead drier to produce a product of high metallic content and controlled acidity or basicity. Cobalt, manganese and zinc may be used in any proportion either singly or together with any amount of free acid, to modify the basicity of a basic lead drier to obtain new and efficient paint or varnish driers.

Other modes of applying the principle of the invention may be employed, change being made as regards the details described, provided the features stated in any of the following claims, or the equivalent of such, be employed.

I therefore particularly point out and distinctly claim as my invention:—

1. A process of making driers, which comprises preparing a basic lead drier salt, and controllably lessening the basicity of the basic salt by reacting on the basic salt with an agent providing an organic carboxyl acid radical reactive therewith the resulting drier being basic but of lesser basicity than the basic lead drier salt initially treated.

2. A process of making driers, which comprises preparing a basic lead drier salt, and controllably lessening the basicity of the basic salt by reacting on the basic salt with an organic carboxyl acid reactive therewith the resulting drier being basic but of lesser basicity than the basic lead drier salt initially treated.

3. A process of making driers, which comprises lessening the basicity of a basic lead drier salt by reacting thereon with resin acid the resulting drier being basic but of lesser basicity than the basic lead drier salt initially treated.

4. A process of making driers, which comprises lessening the basicity of a basic lead drier salt of a petroleum-derived acid by reacting thereon with resin acid the resulting drier being basic but of lesser basicity than the basic lead drier salt initially treated.

5. A process of making driers, which comprises lessening the basicity of a basic lead drier salt of fatty acids oxidized from petroleum by reacting thereon with resin acid the resulting drier being basic but of lesser basicity than the basic lead drier salt initially treated.

6. A process of making driers, which comprises lessening the basicity of a basic lead drier salt of napthenic acids by reacting thereon with resin acid the resulting drier being basic but of lesser basicity than the basic lead drier salt initially treated.

7. A drier compound, comprising a basic lead drier salt having its basicity lessened by resin acid the resulting drier being basic but of lesser basicity than the basic lead drier salt initially treated.

8. A drier compound, comprising a basic lead drier salt of a petroleum-derived acid having its basicity lessened by resin acid the resulting drier being basic but of lesser basicity than the basic lead drier salt initially treated.

9. A drier compound, comprising a basic lead drier salt of fatty acids oxidized from petroleum having its basicity lessened by resin acid the resulting drier being basic but of lesser basicity than the basic lead drier salt initially treated.

10. A drier compound, comprising a basic lead drier salt of naphthenic acids having its basicity lessened by resin acid the resulting drier being basic but of lesser basicity than the basic lead drier salt initially treated.

11. A drier compound, comprising a basic lead drier salt having its basicity lessened by an agent providing an organic carboxyl acid radical reactive therewith the resulting drier being basic but of lesser basicity than the basic lead drier salt initially treated.

12. A drier compound, comprising a basic lead drier salt having its basicity lessened by an organic carboxyl acid reactive therewith the resulting drier being basic but of lesser basicity than the basic lead drier salt initially treated.

KENNETH E. LONG.